July 26, 1960

R. P. KNAPP 2,946,198

METHOD OF COMPACTING SOIL FOR CONDUCTING OFFSHORE OPERATIONS

Original Filed Dec. 20, 1955

*INVENTOR.*
Richard P. Knapp,

BY

ATTORNEY

July 26, 1960

R. P. KNAPP

2,946,198

METHOD OF COMPACTING SOIL FOR CONDUCTING
OFFSHORE OPERATIONS

Original Filed Dec. 20, 1955

*INVENTOR.*
Richard P. Knapp,

BY

ATTORNEY.

July 26, 1960

R. P. KNAPP 2,946,198

METHOD OF COMPACTING SOIL FOR CONDUCTING OFFSHORE OPERATIONS

Original Filed Dec. 20, 1955

INVENTOR.
Richard P. Knapp,
BY
ATTORNEY

July 26, 1960 R. P. KNAPP 2,946,198
METHOD OF COMPACTING SOIL FOR CONDUCTING
OFFSHORE OPERATIONS
Original Filed Dec. 20, 1955 8 Sheets-Sheet 5

INVENTOR.
Richard P. Knapp,
BY
ATTORNEY.

INVENTOR.
Richard P. Knapp,

R. P. KNAPP 2,946,198

METHOD OF COMPACTING SOIL FOR CONDUCTING OFFSHORE OPERATIONS

Original Filed Dec. 20, 1955

INVENTOR.
Richard P. Knapp,
BY
ATTORNEY.

United States Patent Office 2,946,198
Patented July 26, 1960

2,946,198

METHOD OF COMPACTING SOIL FOR CONDUCTING OFFSHORE OPERATIONS

Richard P. Knapp, Houston, Tex., assignor, by mesne assignments, to Jersey Production Research Company, Tulsa, Okla., a corporation of Delaware Original application Dec. 20, 1955, Ser. No. 554,375. Divided and this application Jan. 28, 1957, Ser. No. 636,769

4 Claims. (Cl. 61—46.5)

The present invention is directed to a structure suitable for use in offshore operations. More particularly, the invention is directed to a portable, stable structure which is easily transportable to a marine location. In its more specific aspects, the invention is directed to marine structure which has stability and which is easily transportable to an offshore location.

This application is a division of Serial No. 554,375, filed December 20, 1955, in the name of Richard P. Knapp entitled "Method and Structure For Offshore Operations."

The present invention may be briefly described as a portable, stable structure suitable for use in offshore marine operations which comprises a bottom bearing member having a plurality of interconnected vertically extending buoyancy columns connected to the bottom bearing member on their lower ends. A platform is supported by the buoyancy columns on the upper ends of the buoyancy columns. Vertically adjustable auxiliary buoyancy means are arranged on all or a selected of the buoyancy columns with a portion of the buoyancy means extending inboard of the structure and the remaining portion of the buoyancy means extending outboard of the structure. The bottom bearing member may be provided simply as a mat but may be constructed such that it has buoyancy and may be suitably compartmented and provided with sea chests, valves, and the like for flooding the compartments of the bottom bearing member with water to ballast same and with suitable air connections to blow the water from the compartments. Suitably the buoyant bottom bearing member may have an open bottom and buoyancy given thereto by maintaining a selected air pressure therein.

The structure of the present invention is provided with vertically adjustable spuds arranged in the buoyant columns, such that they may be extended through the lower end of the buoyant columns to serve as mooring and anchoring means by positioning the spuds into the underlying bottom of the marine location where the structure may be located. The spuds are vertically adjustable such that they may be extended or retracted into the buoyant columns. The spuds may be extended or retracted by employing jacks of the hydraulic type and the like, suitable screw and wedge mechanisms, hydraulic means and the like for raising and lowering the spuds. The spuds may suitably be provided with a hydraulic lock, clamps or pins or other means for locking the spuds in position as may be desired.

The present invention is also directed to a method for preloading the soil on which the device of the present invention is positioned. Briefly, in practicing the method of the present invention, the structure is floated into position with the bottom bearing member off bottom. The vertically adjustable auxiliary buoyancy means are then flooded a sufficient amount to cause the bottom bearing member to sink to the bottom. The device is then firmly positioned against vertical movement by driving the spuds downwardly into the soil underneath the bottom bearing member. This is suitably done by exerting hydraulic pressure against the spuds although other means may be employed. Thereafter, the hydraulic pressure is released from the spuds, which have now been driven into the soil and which allows the structure to have some vertical movement but prevents any lateral movement due to wave action, and the like.

The auxiliary buoyancy means are then dewatered which allows the buoyancy means or tanks to rise on the buoyant columns to a point above marine bottom such that they may be firmly attached to the columns by suitable attaching means. The force of the tanks vertically is then exerted on the columns. The auxiliary buoyancy tanks are then flooded with water to the extent that the water level in the auxiliary buoyancy means or tanks is greater than sea level. This is accomplished by pumping water into the auxiliary buoyancy means rather than relying solely on the water entering same through the sea chest. By flooding the auxiliary buoyancy means, the auxiliary buoyancy means moves downwardly causing the buoyant columns to move downwardly therewith since the auxiliary buoyancy means are connected thereto. By adjusting the level of the water in the auxiliary buoyancy tanks, the columns and bottom bearing member are provided with a preload in excess of the preloading which will be maintained on the structure during the marine operations. For example, the preloading on the columns and bottom bearing member may be in the range from about 500 to about 2000 pounds per square foot. This preloading depends on the operating load on the bottom. In the Gulf Coast area a preload of 500 to 2000 pounds per square inch will usually suffice. Ordinarily preloads in the range from about 500 to 1000 pounds per square inch will be satisfactory. Of course, it is realized that the preloading in the practice of the present invention will depend on the operating load on the sea bottom and may vary depending on the region where the offshore operations are conducted.

As the auxiliary buoyancy means or tanks sink, the weight thereof bears down on the buoyant columns and causes the soil under the mat to be compacted by squeezing moisture from the compacted soil. The auxiliary buoyancy tanks may be adjusted with varying amounts of water or preload to level the structure where the structure is not on an even keel.

In practicing the present invention, the auxiliary buoyancy means or tanks are locked to the buoyant columns for a sufficient length of time to compact the soil under the bottom bearing means. This time may suitably range from about 4 hours to about 48 hours. Times from about 4 hours to about 24 hours may be satisfactory and preferred.

The spuds are then locked into position against vertical movement by suitable locking means which may be hydraulic pressure exerted against the spuds to prevent vertical movement. The auxiliary buoyancy means or tanks are then dewatered to a floating position, unlatched, and removed from the buoyant columns. In practicing the method of the present invention, a more stable structure is possible than heretofore.

It is understood that the structure of the present invention may comprise a plurality of extension supporting members constituting "building" blocks made up of interconnected, vertically extending columns. Thus, the platform may be supported on a plurality of "building" blocks or extension supporting members connected to the bottom bearing members and when it is desirable to extend or lower the height of the structure for use in deeper or shallower water the platform may be removed and "building" blocks or extension supporting members either added to the structure or subtracted therefrom. The extension supporting members comprising the interconnected, vertically extending columns would be connected to each other, either by welding or by a bolted flange arrangement which would allow easy removal of the extension supporting members from or addition of the extension supporting members to the structure.

It is contemplated that the auxiliary buoyancy means arranged on all or a selected of the buoyant columns may be removable therefrom. In short, the auxiliary buoyancy means may be provided with a slot and latch arrangement for placing same on the buoyant columns or the buoyancy means may be provided with a removable segment for arranging same on the columns. Alternatively, the auxiliary buoyancy means may comprise a plurality of buoyant chambers interconnected and arranged around selected or all of the buoyant columns. The buoyancy means may also comprise a plurality of buoyant chambers arranged one upon another and separable from each other such that buoyant chambers may be added to provide additional buoyancy or buoyant chambers may be subtracted as may be desired.

Where the buoyancy means are provided with a removable segment, it is contemplated that the buoyancy means and the segment may be provided with opposing surfaces defining complementary obtuse and acute angles with the horizontal axis of the buoyancy means, the sum of the angles being approximately 180°. In short, the buoyancy means may have a surface defining an obtuse angle and the segment may have a surface defining an acute angle or vice versa, the sum of the angles being approximately 180°.

It is contemplated that the auxiliary buoyancy means may be inflatable such that when it is desired to provide auxiliary buoyancy the auxiliary buoyancy means would be inflated and when the auxiliary buoyancy is no longer required the buoyancy means may be deflated as desired.

Thus, the present invention relates to a portable marine platform which provides a stable foundation for machinery, drilling equipment, storage tanks, and the like, a base for salvage operation located over a body of water. The platform involving the structure may be moved with or without the drilling equipment and the like from one water location to another as desired or it may be converted to an improved type of permanent marine structure. The platform is easily adjusted to permit safe use in a wide range of water depths.

The invention is particularly suitable to well drilling operations such as oil and/or gas or sulfur wells and may be used with an auxiliary vessel or platform or suitably may be self-contained to provide the necessary living quarters and warehouse facilities to conduct such marine operations.

The present invention will be further illustrated by reference to the drawing in which.

Referring now to the drawings in which identical numerals will be employed to designate identical parts, and particularly to Figs. 1 to 4, the structure comprises a working structure generally indicated by the numeral 11 which is of rectangular form and having a generally flat working surface generally designated by the numeral 12. The working surface or platform 12 is suitably supported by longitudinal or transverse structural members 13 which are supported by a trusswork indicated generally by the numeral 14 composed of vertically extending columns 15, diagonal members 16, and horizontal girt members 17. The structure is also provided with buoyant columns 18. The trusswork 14 and the buoyant columns 18 terminate in a bottom bearing member 19 which is of general rectangular form with a suitable opening or openings 20 for the conducting of drilling operations and the like. The bottom bearing member is suitably constructed of longitudinal and transverse structural members and may be provided with suitable compartments, chambers, and the like, 21.

Extending through the columns 18 are bottom penetrating mooring spuds indicated generally by the numeral 10 which penetrate into the soil below the bottom bearing member 19 to provide resistance to lateral movement, overturn, and vertical sinkage of the structure. The spuds 10 are adjustable vertically and may be extended or retracted as may be desired.

While the platform structure 12 is shown to have a square working deck and a square bottom bearing member with four buoyant columns forming the four corners of a square horizontal section, it is possible to have other configurations but it is preferred to have a square structure because it provides the most stable structure for a given structural weight. It is to be understood, however, that other shapes and configurations may be used and may be preferable where structural weight is a secondary consideration. For example, a rectangular plan with the length greater than the width may be more desirable where the width is limited by existing land facilities and a greater length is necessary to obtain the required working deck or bearing bottom member area.

As pointed out supra, it is not necessary that the bottom bearing member 19 be a watertight structure and it is preferable that the btotom bearing member 19 have as little buoyancy as possible when the structure is in the moving position. For maximum stability during moving operations the bottom bearing member should be completely flooded or open to the sea, with buoyancy limited to the volume of water displaced by the structural members. As pointed out before some watertight compartmentation may be desirable for the storage of liquids or to float the platform on the surface of the sea for delivery, overhaul and/or repairs.

Figure 1:
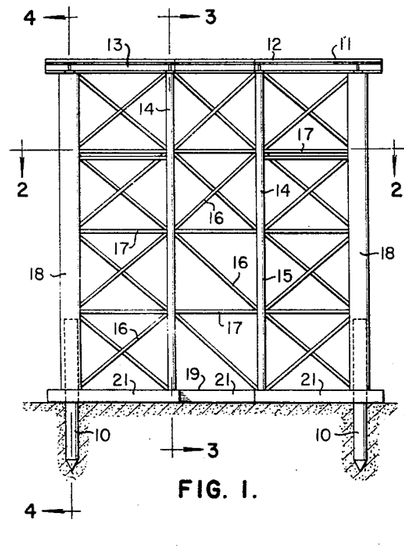
Fig. 1 is a side elevation of the platform structure.
Figure 2:
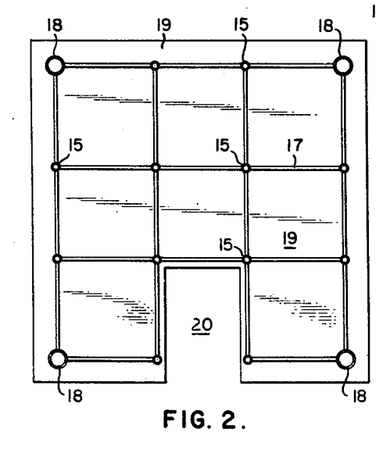
Fig. 2 is a horizontal section along line 2—2 of Fig. 1.
Figure 3:
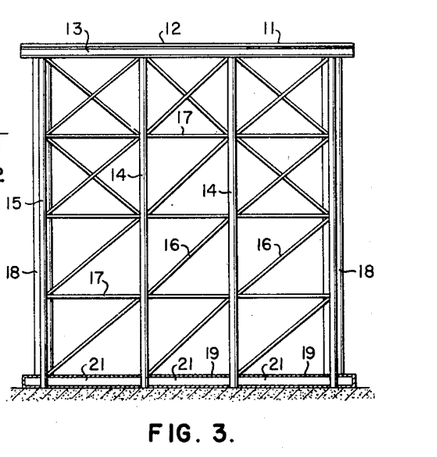
Fig. 3 is a vertical section along line 3—3 of Fig. 1.
Figure 4:
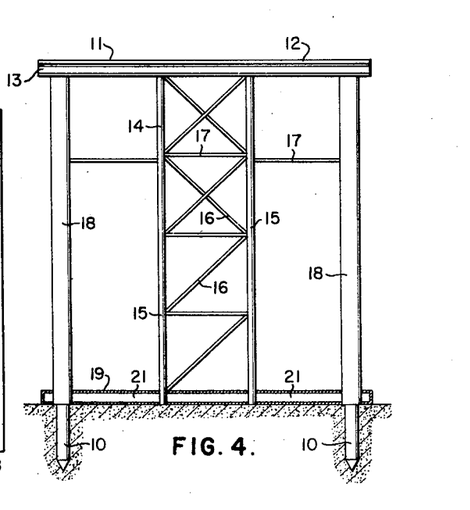
Fig. 4 is a vertical section along line 4—4 of Fig. 1.
Figure 5:
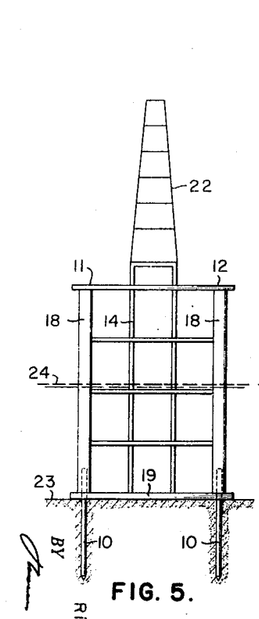
Fig. 5 is a side elevation of the platform structure in a normal well drilling position.
Figure 26:
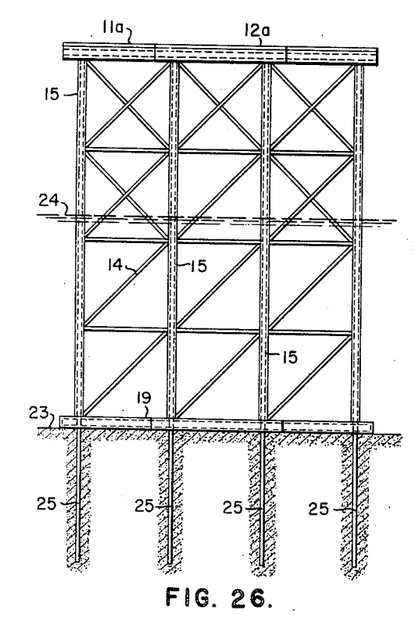
Fig. 26 is a side elevation of the platform in a permanent position with buoyancy transport units and transport columns removed.
Figure 27:
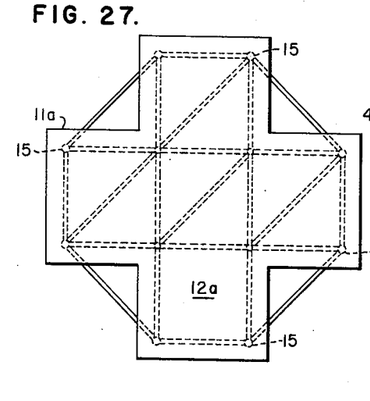
Fig. 27 is a plan view of the platform shown in Fig. 26.

Referring now to Fig. 5, the structure is shown in a normal drilling position with a drilling rig 22 mounted on the platform 12. The spuds 10 have been extended and have been driven into the underlying land 23 with the platform 12 being located a suitable distance above the water level 24 for safe operations. The structure of Fig. 5 may be converted from a stable, temporary, and portable drilling platform to a permanent platform as shown in Figs. 26 and 27 by driving bearing piles, such as 25, through the vertical columns 15 and/or through the buoyant column 18. The number of bearing piles, the depth of penetration, and the size may be determined by the soil and oceanographic conditions encountered at the site of the permanent installation.

It is to be noted that Figs. 26 and 27 are modified structures 11a having a platform 12a. As shown by the plan view in Fig. 27, the platform 12a of the structure 11a has a cross shape which provides a maximum area for this particular shape.

Figure 6:
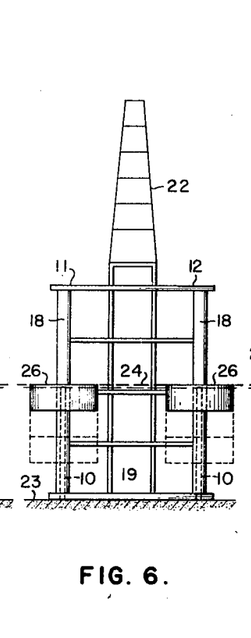
Fig. 6 is a side elevation, showing buoyancy transport units attached and the platform ready for movement to a new drilling site.
Figure 7:
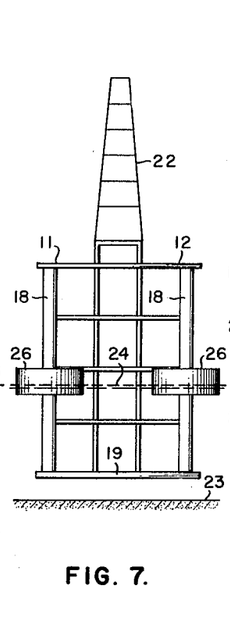
Fig. 7 is a side elevation, showing buoyancy transport units attached and the platform in a normal moving position.

Referring now to Figs. 6 to 9, auxiliary buoyancy means generally indicated by the numeral 26 are attached to the buoyant columns 18 such that the auxiliary buoyancy means 26 are vertically adjustable therein and extend inboard and outboard of the structure. By providing the auxiliary buoyancy means to extend both inboard and outboard, greater stability of the structure is provided than would be otherwise if the auxiliary buoyancy means were completely inboard or completely outboard of the structure. The dotted lines in Fig. 6 show the auxiliary buoyancy means 26 to be vertically adjustable and the position assumed in moving the structure from the underlying land bottom 23. It is to be noted in Fig. 6 that the vertically adjustable spuds 10 have been retracted into the interior of the columns 18 and the structure 11 is in position to be moved offshore. As the auxiliary buoyancy means 26 are dewatered, or inflated if a collapsible type of buoyancy means is used, and with buoyancy provided on the columns 18, sufficient buoyancy is given to the structure 11 to float same off the sea bottom 23. It is to be noted that the auxiliary buoyancy means 26 assume the position as shown in Fig. 7 at sea level to provide a floating structure.

Figure 8:
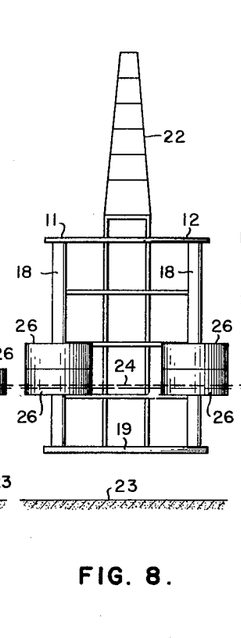
Figs. 8 and 9 are side elevations, showing larger or multiple buoyancy transport units attached and the platform structure in a normal moving position.
Figure 9:
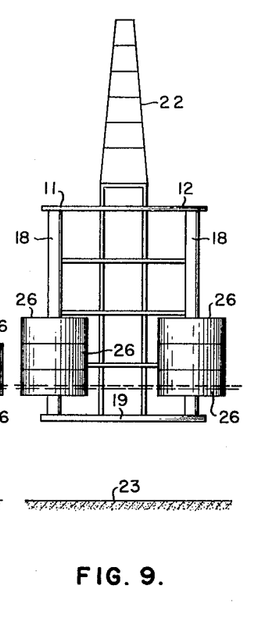

As illustrated in Figs. 8 and 9, additional numbers of auxiliary buoyancy means 26 may be added to the structure as desired to float the structure 11 higher in the water or to give a greater freeboard as shown. The plurality of auxiliary buoyancy means may be suitably locked one to the other by suitable locking means and are separable one from the other and are superimposed on each other by arranging same either below or above the original buoyancy means as provided in Figs. 6 and 7. Of course, it is realized and understood that buoyancy means may be removed as desired to reduce the freeboard. After the structure has been raised to a moving position, as shown in Figs. 7, 8, and 9, it may then be towed or moved to the next desired location and then again sunk to the underlying land bottom 23 and anchored thereto by reversing the steps of the operation as has been described.

Figure 10:
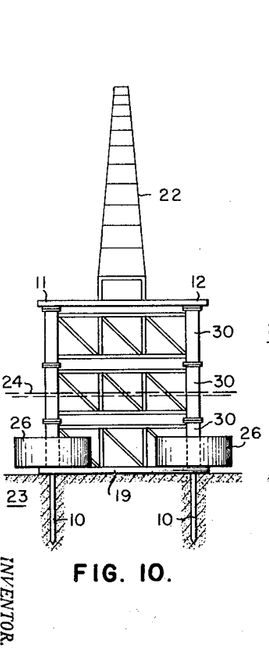
Fig. 10 is a side elevation of the platform structure in an alternate drilling position with buoyancy transport units attached and submerged.
Figure 11:
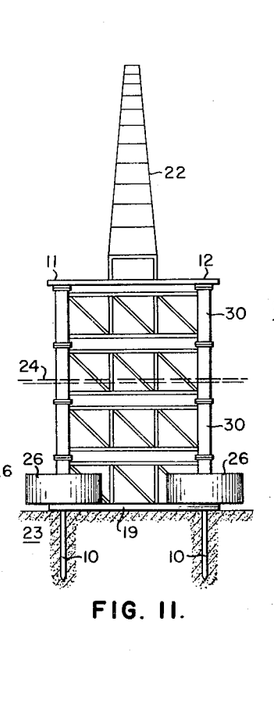
Fig. 11 is a side elevation of the platform structure shown in Fig. 10 after moving to deeper water and the addition of one truss bay or extension member.

As illustrated in Figs. 10 through 13, inclusive, the structure 11 is adjustable in height and is suitably constructed of extension supporting members or building block sections which are generally designated by the numeral 30. In Fig. 10 the structure 11 with the drilling rig 22 is shown landed on bottom 23 with the spuds 10 sunk in the earth and with the bottom bearing member 19 resting on the bottom 23. Auxiliary buoyancy means 26 are resting on the bottom 23, having been filled with water. Assuming that it is desired to raise the level of the platform 12 above the water level 24 preparatory to a move into deeper water, the drilling rig 22 and platform 12 would be removed and another building block 30 would be brought into position and placed on the uppermost of the building blocks 30. The building blocks 30 would be suitably connected to those already in place, such as by welding or by bolted flanges and then the platform 12 and drilling rig 22 would be replaced on the structure, as shown in Fig. 11. Thereafter, as illustrated in Figs. 6 to 9, the structure would be moved from water having a depth of about 33 feet, as shown in Fig. 10, with the platform 12 about 35 feet above water to water having a depth of about 50 feet with platform 12 being about 40 feet above the water level 24, as shown in Fig. 11. The spuds 10 would again be lowered and the structure could then be used again for drilling operations and the like.

Figure 12:
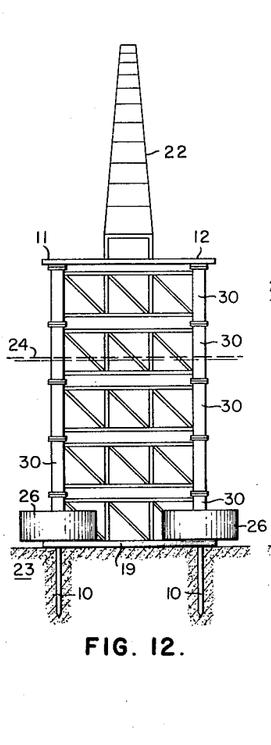
Figs. 12 and 13 are side elevations of the platform structure shown in Fig. 10 after moving to deeper water and the addition of two and three truss bays or extension members.
Figure 13:
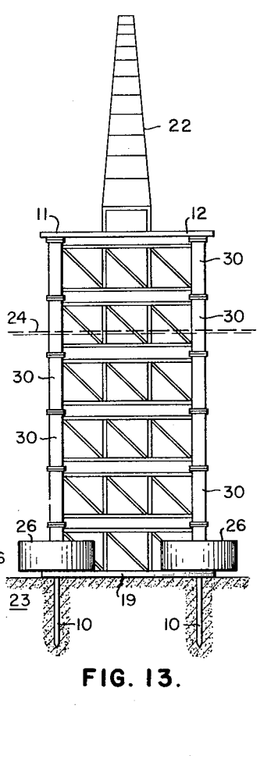

In Figs. 12 and 13 illustrations are given for identical building blocks 30 to provide a structure with respect to Fig. 12 usable in water of about 73 feet depth providing a platform about 24 feet above water level. In Fig. 13, the structure is illustrated which is suitable for drilling operation in 95 foot water.

Figure 14:
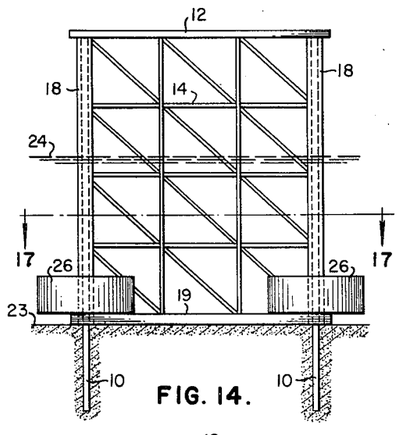
Fig. 14 is a side elevation of the platform in a drilling position with buoyancy transport units attached.
Figure 15:
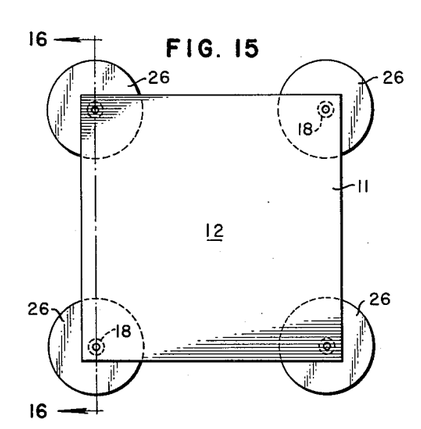
Fig. 15 is a plan view of the platform shown in Fig. 14, showing the working deck area and one arrangement of the buoyancy transport units.
Figure 16:
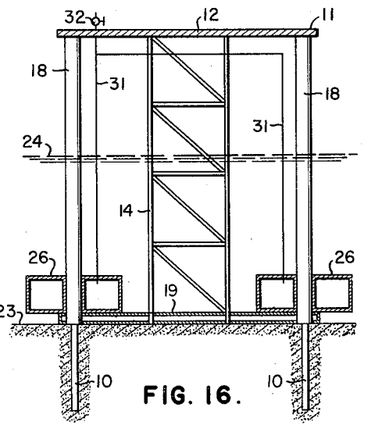
Fig. 16 is a vertical section through the platform along line 16—16 of Fig. 15.
Figure 17:
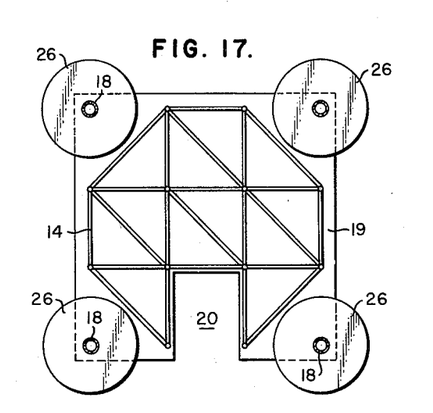
Fig. 17 is a horizontal section through the platform along line 17—17 of Fig. 14.

Referring now to Figs. 14 through 16 it is to be noted that the auxiliary buoyancy means 26 are of general cylindrical shape and extend both inboard and outboard of the structure 11. The spuds 10 are shown driven into the underlying land bottom 23 and with the auxiliary buoyancy means 26 resting on bottom. In Figs. 14 through 16 the auxiliary buoyancy means 26 are arranged permanently on the structure 11 surrounding the columns 18 and 15. Fig. 17 is a plan view showing the opening 20 of the structure 11. When the auxiliary buoyancy means 26 are employed, it will be necessary to provide means for introducing water into and removing water from the auxiliary buoyancy means 26. To this end a flexible connection such as 31 provided with a valve 32 may be arranged to extend from the platform 12 to the buoyancy means 26. This flexible connection 31 may be a suitable hose which may be of deformable material and reinforced with metallic members or may be a braided metal hose and the like. The flexible member 31 may extend inboard and outboard of the structure to provide air pressure to the members 26 or to relieve air pressure therefrom. It is also likely that water may also be pumped into the buoyancy means 26 through line 31 or sea cocks may be provided in each of the buoyancy means 26 and controlled by a valve rod extending up to platform 12.

Figure 18:
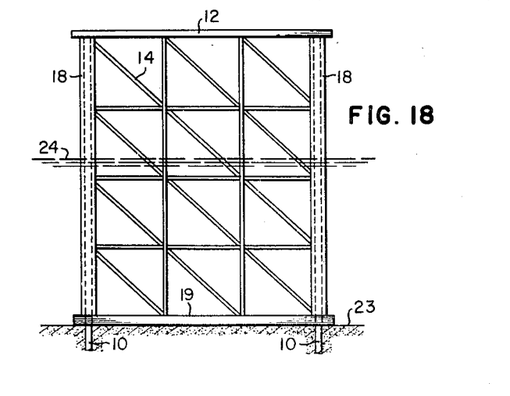
Fig. 18 is a side elevation of the platform in a drilling position with a buoyancy transport units removed.

Fig. 18 is a view similar to Fig. 16 but shows the buoyancy means 26 removed therefrom and the spuds 10 driven into the land bottom 23.

Figure 19:
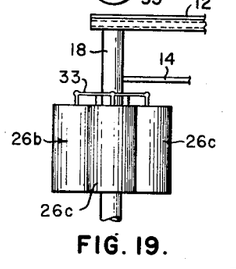
Fig. 19 is a fragmentary view showing a buoyancy transport unit composed of several individual, vertical, buoyant vessel compartments.
Figures 20, 23, 24, 25:
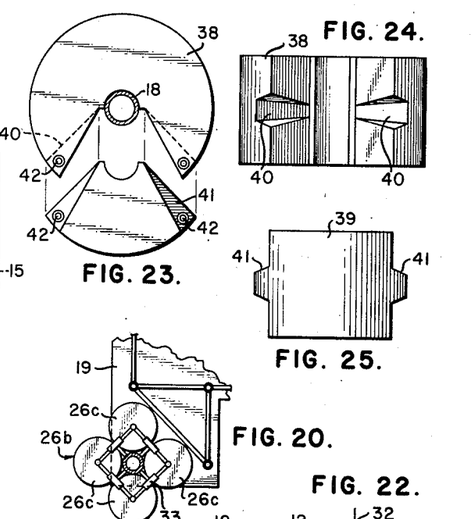
Fig. 20 is a sectional top view of Fig. 19.
Figs. 23, 24, and 25 are top and side elevations of another type of removable buoyancy transport unit.

In Figs. 19 and 20, a modified auxiliary buoyancy means 26b comprised of a plurality of inter-connected vessels 26c are shown. The interconnected vessels 26c are suitably connected by structural members 33 and arranged around selected or all of the columns 18 as may be desired. It will be apparent from Figs. 19 and 20 that the vessels 26c may easily be removed from around any or all of the columns 18 as may be desired.

Figure 21:
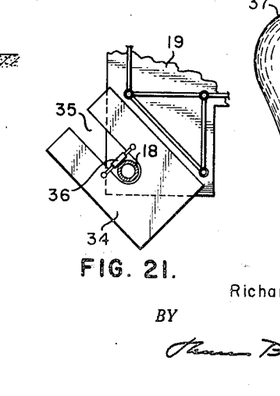
Fig. 21 is a horizontal section similar to Fig. 20 showing the use of a slotted barge or chamber for a buoyancy transport unit.

In Fig. 21 a different type of removable auxiliary buoyancy means is illustrated in which a barge or vessel, such as 34, provided with a slot 35 is arranged around the columns 18 and locked thereon by means of a locking mechanism, such as pin 36. It is to be noted that the vessel 34 may be easily removed by removing the locking mechanism 36 and guiding the vessel 34 off the column 18. It is to be noted that the vessel 34 extends both inboard and outboard of the structure.

Figure 22:
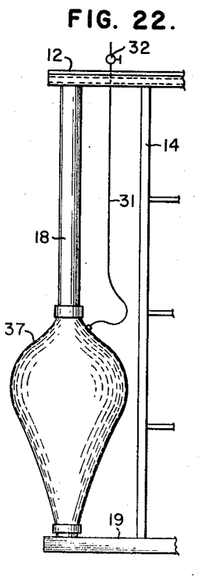
Fig. 22 is a vertical section through an inflatable buoyancy transport unit and a transport column.

Another type of auxiliary buoyancy means is shown in Fig. 22 in which an inflatable member 37 is arranged on the columns 18 to surround same. The inflatable member 37 extends both inboard and outboard of the structure and may suitably be deflated and left to rest on the bottom bearing member 19 when not in use and inflated when in use. To this end, a suitable flexible connecting member, such as 31, extending to the platform 12 and provided with a valve 32 may be used for inflation and deflation as desired.

Referring to Figs. 23, 24, and 25 another type of removable auxiliary buoyancy means is provided. Auxiliary buoyancy means 38 is provided with a removable pie-shaped segment 39 which may suitably be removed from the columns 18 to allow floating off of the auxiliary buoyancy means 38 therefrom. The auxiliary buoyancy means 38 and the pie-shaped segment 39 thereof are provided with complementary sloping surfaces 40 and 41 which define complementary acute and obtuse angles with the horizontal axis of the member 38. By virtue of providing sloping surfaces 40 and 41 the segment 39 may suitably be pinned and latched to the auxiliary buoyancy means 38. Passengeways 42 are provided to receive pins, not shown, to latch the auxiliary buoyancy means 38 and segments 39 thereto.

Figure 29:
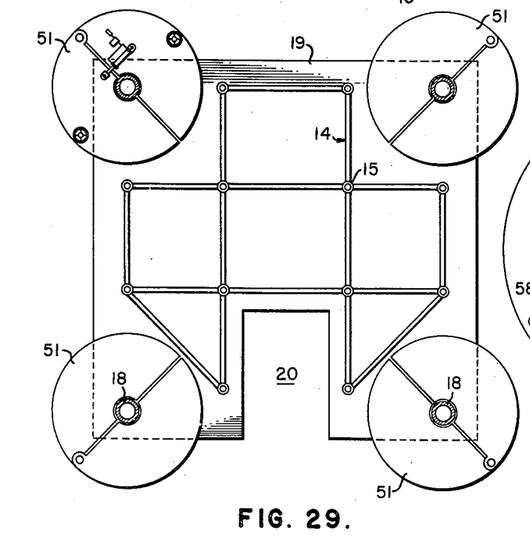
Fig. 29 is a sectional view taken along the line 29—29 of Fig. 28.
Figure 30:
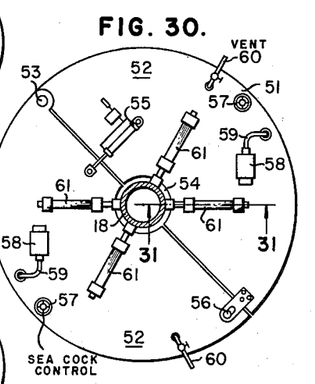
Fig. 30 is an enlarged plan view of one of the buoyancy means of Figs. 28 and 29.

Referring specifically to Figs. 29 and 30, the buoyancy transport means 51 are composed of two equal or approximately equal tank sections 52 which are joined at one side by a hinged connection 53. The two sections 52 provide an annular central opening 54 large enough to accommodate the buoyancy columns 18. The sections 52 are opened and closed by hydraulic means generally indicated by numeral 55 which may comprise a piston and cylinder arrangement operated by a suitable pump. The sections 52 may be locked together in a closed position by a pin such as 56. The buoyancy transport means 51 may also be of the type shown in Figs. 23, 24, and 25.

Each of the sections 52 of the buoyancy transport means is provided with a sea cock controlled by a valve wheel 57. The sections are also provided with a deep well type pump 58 provided with a conduit 59 projecting into the tank section for the purpose of dewatering the sections when desired. The water in the sections may be pumped out by means of the pump 58, or the water may be forced out by pumping in air and opening the sea cocks by valve wheel 57. The tank sections 52 are provided with vents 60 for the release of air when flooding the sections with water.

Figures 28, 31:
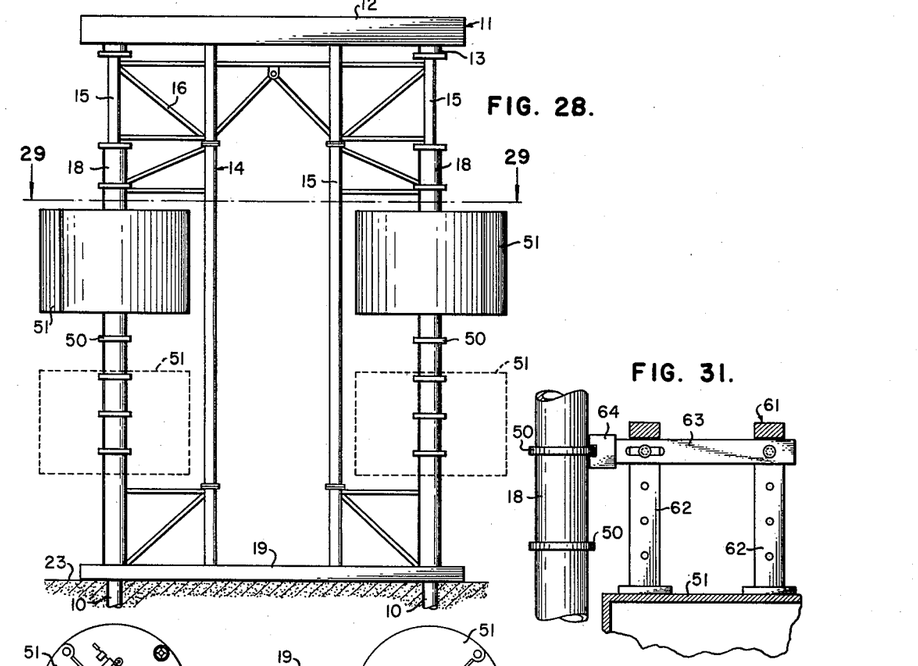
Fig. 28 is a side elevation of the platform with the buoyancy means in transporting position.
Fig. 31 is a view partly in section taken along the line 31—31 of Fig. 30.

As shown in Figs. 30 and 31, the buoyancy means 51 are provided with latching means 61 for the purpose of latching the buoyancy means to the columns 18. This latching means is each comprised of two upright racks 62 having adjustably mounted thereon a cross bar 63 for vertical and horizontal movement. The cross bar 63 is provided on one end thereof with a U-shaped clevis 64 which engages with one of a series of vertical spaced apart annular shoulders 50 of the columns 18. Engagement of these latching means and dewatering or flooding of the buoyancy means affords a lifting or lowering force to be exerted on the platform structure 11.

The device as shown in Figs. 28 through 31 operates and may be used in a similar fashion to the other embodiments shown.

Figures 32, 33, 34:
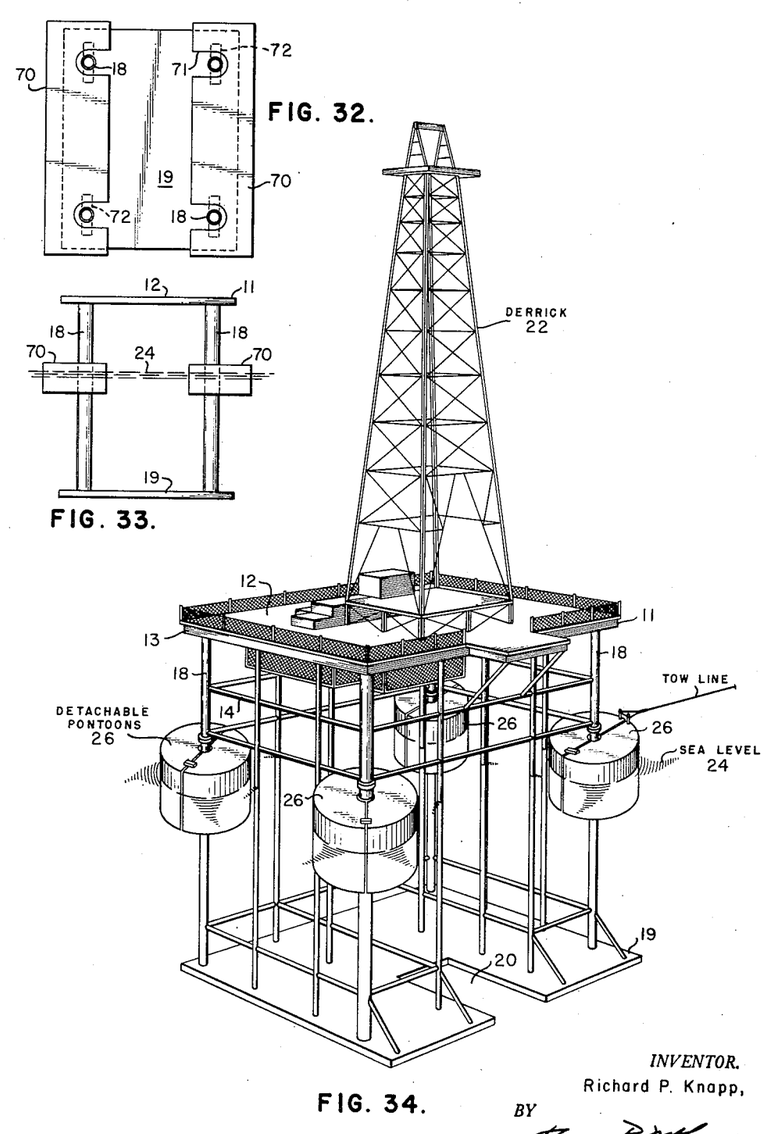
Figs. 32 and 33 are top and side views, respectively, of another type of buoyancy transport means.
Fig. 34 is a perspective view of the platform, equipped with drilling derrick, being transported.

Referring now to Figs. 32 and 33, a structure, such as 11, provided with a platform 12 and columns 18 has a plurality of auxiliary buoyancy means 70 removably arranged on the columns 18. These auxiliary buoyancy means 70 are generally rectangular in shape with segments, such as 71, cut out therefrom to allow the auxiliary buoyancy means 70 to be placed removably on the columns 18. After the auxiliary buoyancy means 70 have been placed in position, they may be suitably locked therein by suitable locking means indicated generally by the numeral 72. This locking mechanism may suitably be a member which will make a snug fit around the column 18 to prevent lateral movement and to allow vertical movement as may be desired. For example, a horizontally retractable member which has an outer arcuate surface, such as indicated, may be positioned in contact with the outer periphery of the columns 18 to lock the auxiliary buoyancy means 70 against lateral movement but for vertical movement thereon as desired. It is understood that the means 70 may be locked against vertical movement as well.

In practicing the present invention, the structure 11 would be floated into position and the auxiliary buoyancy means 26 would then be flooded with a sufficient amount of water to cause the structure to sink to the sea bottom 23 with the mat 19 on bottom. Thereafter, the spuds 10 would be sunk or forced into the earth 23 by suitable hydraulic means, not shown. Hydraulic pressure is then released which will allow some vertical movement of the structure 11. The auxiliary buoyancy tanks 26 are then dewatered which allow them to rise on the columns 18 to a floating position. The auxiliary buoyancy means 26 are then latched or locked to the columns 18 such that any force exerted by the tanks 26 will be exerted on the columns 18. The auxiliary buoyancy tanks 26 are then flooded with water or have water pumped in to a level above the sea level sufficient to provide a preload on the bottom bearing member 19 in excess of that which will be employed on the structure 11. As the auxiliary tanks 26 sink with the columns 18, the soil making up the bottom 23 is compacted under the bottom bearing member 19 to cause moisture to be squeezed out therefrom. The tanks 26 provide preload for the time indicated and then the spuds 10 are locked into position against vertical movement. The tanks 26 are then dewatered to a floating position, unlatched from the columns 18 and then removed therefrom as desired.

Figure 35:
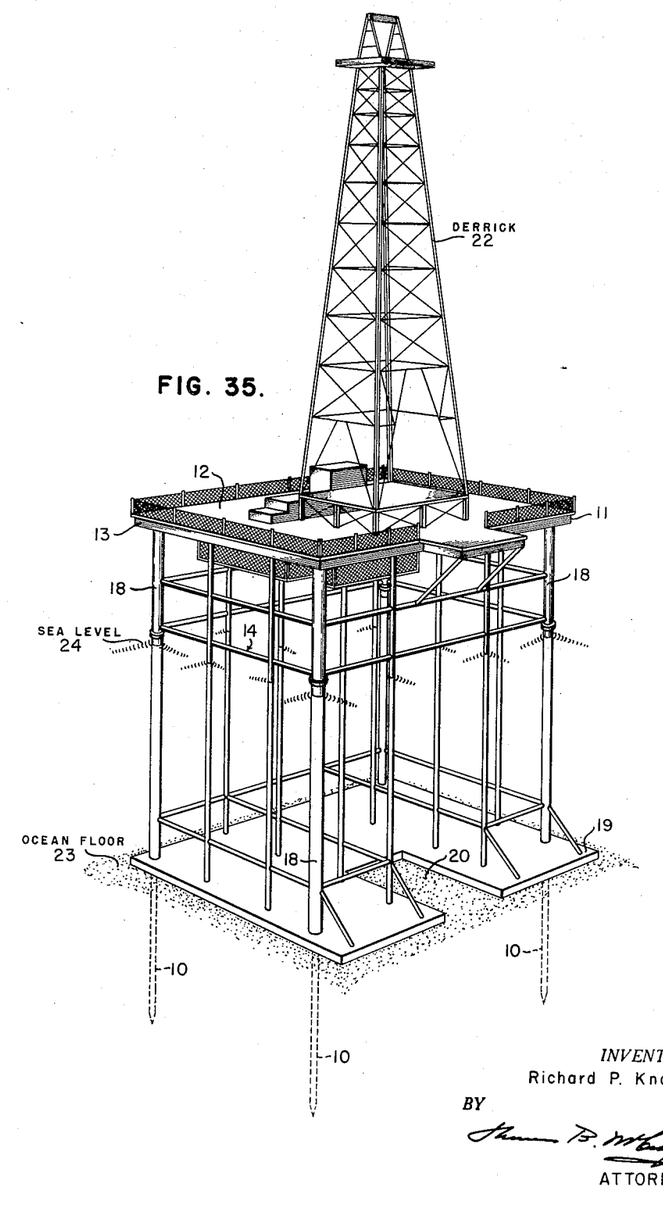
Fig. 35 is a perspective view of the platform of Fig. 34 in a drilling position and with the buoyancy means removed.

Figs. 34 and 35 are perspective views illustrating the structure 11 which could be any of the embodiments as described in the transporting position with the buoyancy means attached and in the anchored position with the buoyancy means removed.

The present invention is of considerable utility and advantage in that a stable marine structure is provided which is easily removable and may be anchored permanently at a desired marine location. The structure has stability in that the auxiliary buoyancy means extend both inboard and outboard of the structure. Furthermore, the structure is adjustable in height and may be removed from shallow to deep water or vice versa and used therein. Furthermore, the structure is of considerable utility in that the auxiliary buoyancy means may be arranged permanently on the structure or releasable therefrom.

The nature and objects of the present invention having been completely described and illustrated, what I wish to claim as new and useful and to secure by Letters Patent is:

1. A method for compacting the soil under an offshore marine drilling structure provided with a flat rectangular bottom bearing member which comprises floating the structure into position with the bottom bearing member off marine bottom, sinking said structure until the bottom bearing member rests on marine bottom, anchoring said structure against lateral movement by driving spuds into the marine bottom at the corners of said structure, preloading said bottom bearing member on the corners thereof a sufficient amount to provide a load on the bottom bearing member in excess of the operating load exerted on the bottom bearing member, said preloading being effected by exerting weight on the bottom bearing member from a point above marine bottom with water filled tanks for a sufficient length of time to compact the earth's structure beneath the bottom bearing member, locking said structure to said spuds against vertical movement relative to the soil, and then removing said preload exerted by said tanks from said bottom bearing member.

2. A method in accordance with claim 1 in which the time is in the range from about 4 to about 48 hours.

3. A method in accordance with claim 1 in which the preloading amount is in the range from about 500 to about 2000 pounds per square foot of said bottom bearing member.

4. A method in accordance with claim 1 in which the structure is locked against vertical movement by hydraulic pressure.

References Cited in the file of this patent

UNITED STATES PATENTS

| | | |
|---|---|---|
| Re. 24,346 | Dawson | Aug. 20, 1957 |
| 2,248,051 | Armstrong | July 8, 1941 |
| 2,574,140 | Boschen | Nov. 6, 1951 |
| 2,750,750 | Kuss et al. | June 19, 1956 |